United States Patent
Bytheway et al.

(10) Patent No.: US 10,175,837 B2
(45) Date of Patent: Jan. 8, 2019

(54) OFFSET CHARGE INJECTION FOR INCREASING MEASUREMENT SECURITY

(71) Applicant: CIRQUE CORPORATION, Salt Lake City, UT (US)

(72) Inventors: Jared G. Bytheway, Sandy, UT (US); Keith L. Paulsen, Centerville, UT (US); Brent Quist, Bountiful, UT (US); Paul Vincent, Kaysville, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 15/339,092

(22) Filed: Oct. 31, 2016

(65) Prior Publication Data

US 2017/0123578 A1    May 4, 2017

Related U.S. Application Data

(60) Provisional application No. 62/249,238, filed on Oct. 31, 2015.

(51) Int. Cl.
*G06F 3/041*    (2006.01)
*G06F 3/044*    (2006.01)

(52) U.S. Cl.
CPC ............ *G06F 3/044* (2013.01); *G06F 3/0416* (2013.01); *G06F 3/0418* (2013.01)

(58) Field of Classification Search
CPC ....... G06F 3/0416; G06F 3/044; G06F 3/0418
See application file for complete search history.

(56) References Cited

U.S. PATENT DOCUMENTS

| | | | | |
|---|---|---|---|---|
| 6,630,896 B1 * | 10/2003 | Nathan | ............... | G06F 3/045 178/18.01 |
| 8,089,289 B1 * | 1/2012 | Kremin | ............... | G01D 5/24 324/658 |
| 9,245,154 B2 * | 1/2016 | Andreasson | ............ | G06F 21/83 |
| 2007/0046335 A1 * | 3/2007 | Becker | ................ | H03K 5/00 326/93 |
| 2011/0219459 A1 * | 9/2011 | Andreasson | ............ | G06F 21/83 726/28 |
| 2012/0280923 A1 * | 11/2012 | Vincent | .................. | G06F 21/83 345/173 |
| 2014/0111474 A1 * | 4/2014 | Bytheway | ............... | G06F 3/044 345/174 |
| 2014/0139448 A1 * | 5/2014 | Levesque | ................ | G06F 3/041 345/173 |
| 2014/0327651 A1 * | 11/2014 | Bytheway | ............... | G06F 21/31 345/174 |
| 2014/0375580 A1 * | 12/2014 | Peshkin | ................. | G06F 3/016 345/173 |

(Continued)

*Primary Examiner* — Patrick F Marinelli
(74) *Attorney, Agent, or Firm* — Parsons Behle & Latimer

(57) ABSTRACT

A system and method for injecting a signal on a sense electrode in order to increase the security of the touch sensor if signals are capable of being intercepted by a probe, the injected signals being capable of creating a signal on the sense electrode that replicates the signal of an actual finger, creating a signal on a sense electrode that is equal to but opposite of an actual finger in order to cancel out the signal from the actual finger and therefore hide its presence, and create a pseudo random signal on sense electrodes so that it is difficult to correlate measurable signals on sense electrodes to actual finger position.

8 Claims, 4 Drawing Sheets

(56) References Cited

U.S. PATENT DOCUMENTS

2016/0357342 A1* 12/2016 Olley ..................... G06F 3/044
2017/0017943 A1*  1/2017 Bilhan ................ G07F 19/2055
2017/0123578 A1*  5/2017 Bytheway ............. G06F 3/0418
2017/0168572 A1*  6/2017 Peshkin .................. G06F 3/016
2017/0336892 A1* 11/2017 Chang .................... G06F 3/044

* cited by examiner

OFFSET CHARGE INJECTION FOR INCREASING MEASUREMENT SECURITY

BACKGROUND OF THE INVENTION

Field of the Invention

This invention relates generally to touch sensor circuitry that uses capacitive sensing technology. Specifically, the invention pertains to a system and method for injecting a signal on a sense electrode in order to provide increased security when operating a touch sensor that is subject to being probed and signals intercepted therefrom.

Description of the Prior Art

There are several designs for capacitance sensitive touch sensors which may take advantage of a system and method that is capable of injecting electrical charge on a sense electrode of a touch sensor. It is useful to examine the underlying technology of the touch sensors to better understand how any capacitive sensing touchpad may take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

It should be understood that use of the term "touch sensor" throughout this document may be used interchangeably with "forcepad", "touchpad", "proximity sensor", "touch and proximity sensor", "touch panel" and "touch screen".

BRIEF SUMMARY OF THE INVENTION

In a first embodiment, the present invention is a system and method for injecting a signal on a sense electrode of a touch sensor in order to increase the security of the touch sensor if signals on the sense electrode are capable of being intercepted by a probe, the injected signals being capable of creating a signal on the sense electrode that replicates the signal of an actual finger, creating a signal on the sense electrode that is equal to but opposite of an actual finger in order to cancel out the signal from the actual finger and therefore hide the presence of the finger, and creating a pseudo random signal on a plurality of sense electrodes so that it is difficult to correlate measurable signals on the sense electrodes to actual finger position.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The embodiments of the invention are directed to the injecting of a signal, or electrical charge, on one or more sense electrodes. The sense electrodes are measured by touch sensor control circuitry to detect the presence of one or more fingers. Injecting a signal on one or more sense electrodes may be done for at least three purposes. These purposes include, but should not be considered as limited to, creating a signal from a fake finger, canceling out a signal from an actual finger, and creating confusion as to the presence of any actual signals by using randomized measurement waveform modulation.

The overall purpose of signal injection is to increase the security of a touch sensor system if signals from that system are capable of being intercepted. For example, a probe my monitor the signal on one or more sense electrodes. Security may be increased by creating fake fingers, hiding real fingers, and creating randomized signals that confuse an intruder from distinguishing between real and fake finger signals. It should be understood that the signal injection techniques to be disclosed in the following embodiments may be used separately or in combination with each other.

During operation of a typical touch sensor, voltage transients on the sense electrodes may be modulated based on their capacitive loading (e.g. when a finger is present). The embodiments may be applied to a single sense electrode or to a plurality of sense electrodes.

During operation, a touch sensor controller receives signals from the plurality of sense electrodes. A change in transient signals on the plurality of sense electrodes may be used to derive finger placement on the surface of the touch sensor. The change in transient signals may also be used in proximity as well as touch sensing.

The objective of the embodiments is to reduce data leakage caused by a probe that is monitoring signals on one or more sense electrodes by 1) creating phantom fingers and therefore creating misinformation, 2) canceling out real fingers to create reduced measurability, and 3) creating noise to hide the operation of the touch sensor through obfuscation of all signals.

Figure 1:
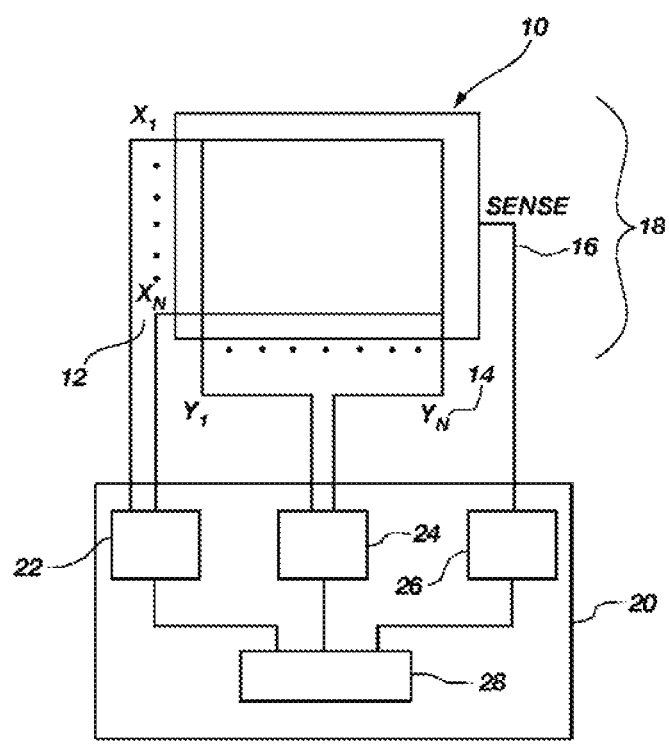
FIG. 1 is a schematic diagram of the prior art capacitance sensitive touchpad provided by CIRQUE® Corporation.
Figure 2:
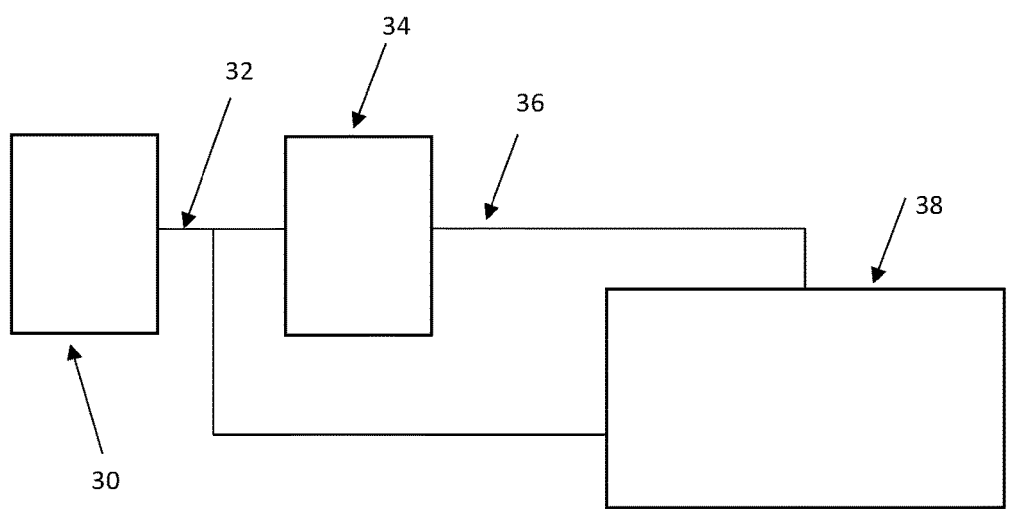
FIG. 2 is a block diagram of a first embodiment of the invention.

FIG. 2 is a block diagram of a first embodiment of the present invention that illustrates some aspects of operation. First, a touch controller 30 provides a drive signal 32 that will be transmitted to the drive electrodes of a touch sensor 38. The drive signal 32 may also be modified to provide the signal that will be injected into one or more sense electrodes of the touch sensor 38. The modified signal 36 will either hide the existence of an actual finger, indicate the presence of a fake finger, or create random signals that may both hide real fingers and also show fake fingers. Modification circuitry 34 may receive the drive signal 32 and create the modified signal 36.

Figure 3:
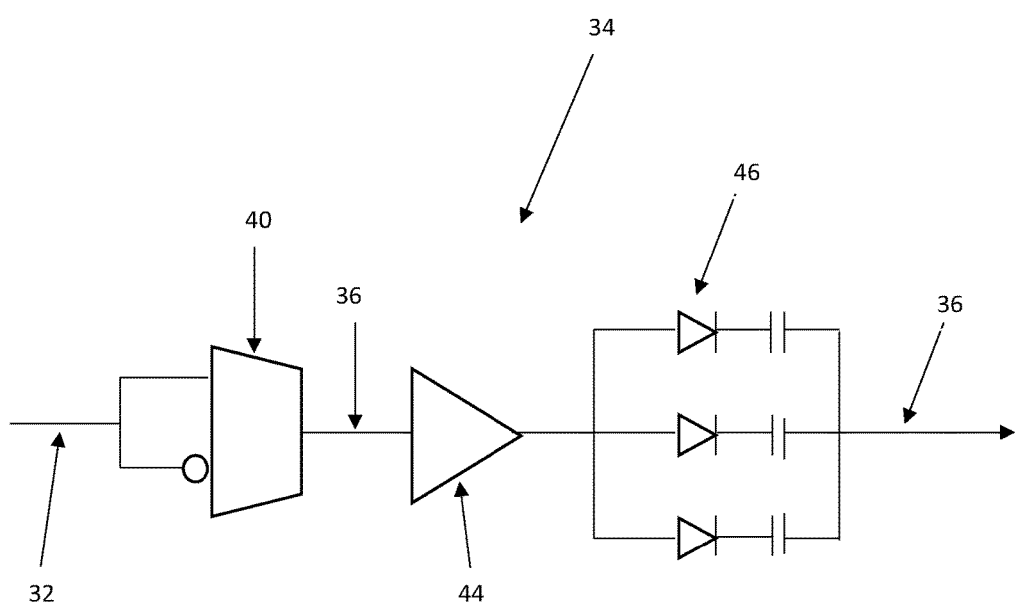
FIG. 3 is a circuit schematic of a first embodiment of modification circuitry that may be used in the first embodiment.

FIG. 3 is one embodiment of a schematic drawing showing detail of the modification circuitry 34. Signal injection may be accomplished by modifying the drive signal 32 used for stimulus of the drive electrodes of the touch sensor 38. It should be understood that the embodiment shown in FIG. 3 is only one implementation that may be chosen, and should not be interpreted as limiting other circuitry that may accomplish the same functions as described in FIG. 2.

The drive signal 32 may be sent to a circuit that enables the user to select the polarity of a modified driver signal 36, where a positive signal is for cancellation and a negative signal is for creating a fake or phantom finger. Modified driver signal 36 may be sent to an internal electrode driver 44 to obtain a transient effect that is similar to the driver signal 32 that is sent from the touch controller 30 straight to the drive electrodes of the touch sensor 38. The modified driver signal 36 of the internal electrode driver 44 may then be sent to a capacitive array 46 in order to select a magnitude of the modified driver signal 36.

It should be understood that the number of capacitors arranged in parallel may be modified, as well as the amount of charge stored on the capacitors in the capacitive array 46. What is important is that it may be possible to select the magnitude of any modified driver signal 36 that is injected on one or more sense electrodes of the touch sensor 38.

The number of capacitors in the capacitive array 46 should be selected so that a user would be able to put the largest desired charge on the modified driver signal 36 which would then be transmitted to one or more sense electrodes of the touch sensor 38.

In an alternative embodiment, the magnitude of the drive signal 32 may be varied in order to affect the modified drive signal 36 being created for the one or more sense electrodes.

In another alternative embodiment, the current being transmitted to the one or more sense electrodes may be varied to also affect the modified driver signal 36 being created for the sense electrodes.

In another embodiment, a pseudo random magnitude of the modified driver signal 36 being injected onto the sense electrodes may be selected using the capacitive array 46.

It should be understood that the finger mentioned above may be any object that is detectable by a touch sensor 38, including a finger or any conductive or dielectric object.

Figure 4:
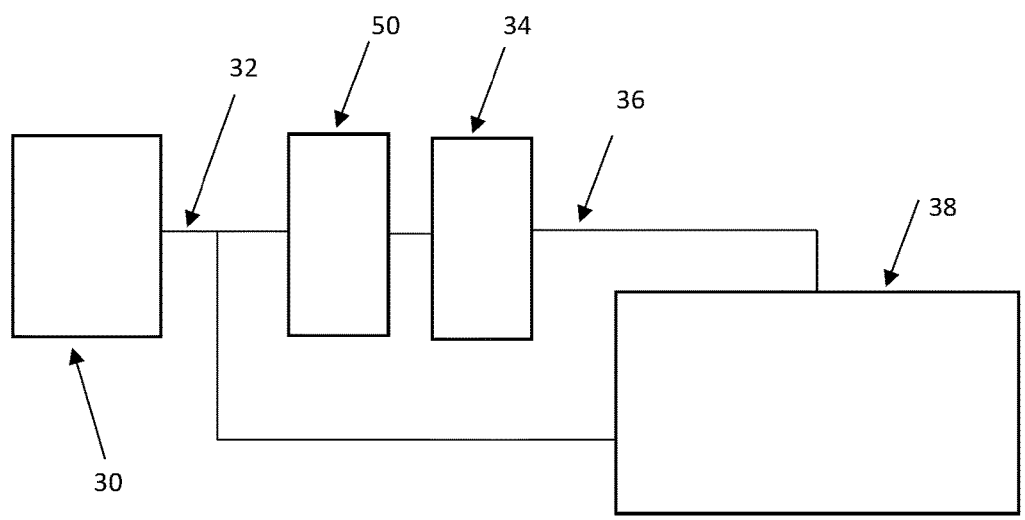
FIG. 4 is a block diagram of an alternative embodiment of the invention.

FIG. 4 is an alternative embodiment of the invention. The block diagram of FIG. 2 has been modified so that the circuit now includes a programmable delay. In this embodiment, the programmable delay circuit 50 may be disposed in front of the modification circuitry 34. The programmable delay circuit 50 may incorporate a delay into the modified drive signal 36. More specifically, the time that the modified drive signal 36 is injected into the sense electrode 38 may be chosen, or a specific delay may be chosen, in order to have control of when the modified drive signal is injected. The delay may be programmable.

The delay may be selected to match the application of the modified drive signal 36 to the drive stimulus propagation delay through the sensor to make the voltage transients more coincidental.

For example, during operation of a touch sensor 38, particularly with a touch sensor that has higher resistance electrodes such as those made from ITO, the drive signal 32 may have a measurable propagation delay from the touch controller 30 through the touch sensor 38 to the sense electrodes. If the modified drive signal 36 injection is applied simultaneous to the drive signal 32 being sent to the drive electrodes of the touch sensor 38, it may be easy to observe the modified drive signal 36 as being different in time compared to the drive signal 32. By using a delay to make the modified drive signal 36 appearance at the sense electrodes occur simultaneous to the drive signal at the drive electrodes, it makes it more difficult to differentiate between the two signals.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for increasing security of a touch sensor having at least one sense electrode that is measured during operation of the touch sensor, said method comprising:
    outputting a drive signal from a touch controller to:
        a drive electrode of a touch sensor; and
        to a modification circuit;
    using the modification circuit to:
        select a polarity for the drive signal to create a polarized drive signal;
        obtain a transient effect on the polarized drive signal to create a modified drive signal; and
    select a magnitude of the modified drive signal; and
    injecting the modified drive signal into the at least one sense electrode of the touch sensor to thereby increase the security of the touch sensor.

2. The method of claim 1 further comprising:
    using the modification circuit to select a positive polarity for the polarized drive signal and wherein the injected modified drive signal cancels a sensed signal due to a change in a transient signal on the at least one sense electrode.

3. The method of claim 1 further comprising:
    using the modification circuit to select a negative polarity for the polarized drive signal and wherein the injected modified drive signal creates a sensed signal on the at least one sense electrode.

4. The method of claim 1 further comprising: using the modification circuit to select a pseudo random magnitude for the modified drive signal.

5. The method of claim 1 further comprising:
    outputting the drive signal from the touch controller to a programmable delay circuit.

6. A system for increasing security of a touch sensor having at least one sense electrode that is measured during operation of the touch sensor, said system comprising:
    a touch controller outputting a drive signal to: a
        drive electrode of a touch sensor; and
        to a modification circuit;
    the modification circuit comprising:
        a circuit to set a polarity for the drive signal and create a polarized drive signal;
        an internal electrode driver to create a transient effect on the polarized drive signal and create a modified drive signal; and
        a capacitive array to set a magnitude of the modified drive signal; and a signal injector to inject the modified drive signal into the at least one sense electrode of the touch sensor to thereby increase the security of the touch sensor.

7. The system of claim 6 further comprising: a pseudo random generator using the modification circuit to select a pseudo random magnitude for the modified drive signal.

8. The system of claim 6 further comprising:
    a programmable delay circuit that delays the output of the drive signal from the touch controller to the modification circuit.

* * * * *